United States Patent
Setzer et al.

(10) Patent No.: US 6,216,977 B1
(45) Date of Patent: Apr. 17, 2001

(54) DIRECT-DRIVE COILER

(75) Inventors: Helmut Setzer, Siegen; Ulrich Patzelt, Hilchenbach; Georg Gernand, Kreuztal, all of (DE)

(73) Assignee: SMS Schloemann-Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 09/194,272

(22) PCT Filed: May 13, 1997

(86) PCT No.: PCT/EP97/02448

§ 371 Date: May 17, 1999

§ 102(e) Date: May 17, 1999

(87) PCT Pub. No.: WO97/45214

PCT Pub. Date: Dec. 4, 1997

(30) Foreign Application Priority Data

May 24, 1996 (DE) .............................................. 196 21 171

(51) Int. Cl.[7] .................................................. B65D 75/24
(52) U.S. Cl. ...................................... 242/573.7; 242/576.1
(58) Field of Search .............................. 242/573.7, 573.9, 242/573.2, 573, 576.1; 279/2.06, 2.09

(56) References Cited

U.S. PATENT DOCUMENTS

| | | |
|---|---|---|
| 1,956,906 * | 5/1934 | Mikaelson ..................... 242/573.2 X |
| 2,352,580 * | 6/1944 | Wettengel ......................... 242/573.7 |
| 2,556,149 | 6/1951 | Talbot . |
| 2,989,263 * | 6/1961 | Smeets .............................. 242/573.7 |
| 3,079,102 * | 2/1963 | Douglas ........................ 242/576.1 X |
| 3,300,157 * | 1/1967 | Koreishi . |
| 3,754,720 * | 8/1973 | Gross et al. ...................... 242/573.7 |
| 4,630,785 * | 12/1986 | Buchegger et al. .............. 242/573.7 |
| 5,080,401 | 1/1992 | Stich . |
| 5,702,045 * | 12/1997 | Tschirner ............................. 226/191 |
| 5,996,929 * | 12/1999 | Mazodier et al. ................ 242/573.7 |

FOREIGN PATENT DOCUMENTS

| | | |
|---|---|---|
| 2190111 | 1/1974 | (FR) . |
| 903863 | 8/1962 | (GB) . |

OTHER PUBLICATIONS

Patent Abstracts of Japan, vol. 007, No. 215, (M–244), Sep. 22, 1983 & JP 58 110126 A (Hitachi Seisakusho KK), Jun. 30, 1983.

* cited by examiner

*Primary Examiner*—Donald P Walsh
*Assistant Examiner*—Collin A. Webb
(74) *Attorney, Agent, or Firm*—Friedrich Kueffner

(57) ABSTRACT

For a directly driven coiler for winding rolled strip into coils, a piston/cylinder unit is proposed which can be supplied with pressure medium through rotary feeds arranged on a shaft extension or on a coiler shaft.

7 Claims, 4 Drawing Sheets

DIRECT-DRIVE COILER

BACKGROUND OF THE INVENTION

1. Field of the Invention

The invention relates to a directly driven coiler for winding rolled strip into coils in accordance with the preamble of claim 1.

2. Description of the Related Art

Such directly driven coilers have become known, for example, through DE-PS 17 52 185 or DE-OS 39 39 119. In these coilers, the relative axial displacement between the coiler shaft and the plunger connected to the segments is effected through mechanical adjustment drives. These adjustment drives are bent lever drives or spring assemblies and spacer elements which can only be actuated when the coiler stands still. Any retightening during the coiling process is not possible in these adjustment drives.

Piston-cylinder units have become known through DE-OS 35 02 452 by means of which it is possible to tighten and release the spring assemblies which serve as adjustment drives and have the above-described disadvantages.

EP-PS 0 004 854 also discloses a piston-cylinder unit which serves directly as an adjustment drive for spreading and despreading the coiler. However, these two coilers provided with piston/cylinder units are not directly driven coilers of the generic type mentioned above, but indirectly driven coilers in which the drive motor is arranged next to the coiler shaft.

The coiler according to EP-OS 0 004 854 does have central rotary feeds, so that, for example, retightening during the coiling procedure is possible, however, if the drive motor for the coiler were to be flanged directly to the coiler shaft, this would result in difficulties in connection with the pressure medium supply because, as a rule, only solid motor shafts are being used, so that the pressure medium could not be conducted to the piston/cylinder unit from the end of the shaft where the pressure medium is fed in. However, if the pressure medium supply is to be placed through the motor shaft, the magnetic effect in the motor could magnetize metal particles in the pressure medium and could possibly lead to clogging of the supply lines. In addition, complicated flexible pressure medium connections would have to be provided in order to bridge any lateral offsets or axial displacements between the drive unit and the coiler shaft.

Rotary feeds have become known through DE-PS 38 06 931 through which the pressure medium can be conveyed radially into a shaft; these rotary feeds have very narrow manufacturing tolerances for an optimum operation, wherein these very narrow manufacturing tolerances exclude a use in difficult conditions as they prevail in rolling mills. In addition, these rotary feeds can only be used up to structural sizes with a maximum 18 mm diameter at the annular gap. Also for this reason, a use in rolling mill plants, for example, rolling mill coilers, where significantly greater diameters are used, could not take place.

SUMMARY OF THE INVENTION

Therefore, the invention is based on the object of further developing a directly driven coiler of the generic type in such a way that it can be moved for spreading and despreading even during the coiling operation.

In accordance with the invention, the direct-drive coiler for winding and/or unwinding rolled strip includes a drum composed of several segments which can be moved so as to be spread and which rest with conically-shaped sliding surfaces against a coiling shaft mounted rotatably cantilevered in a coiler housing, and a plunger guided in the coiler shaft. The plunger is connected through a connecting flange to the drum segments. An axially extending cylinder is mounted in the coiler shaft. The cylinder has a piston which is connected to the plunger and which can effect a relative axial displacement between the coiler shaft and the plunger connected to the segments for producing a spreading movement of the segments. The coiler shaft extends beyond the cylinder with a flanged-on shaft extension which closes the cylinder in the direction toward the axially arranged, directly driving motor. A rotary feed is provided through which pressure medium can be supplied to the piston/cylinder unit provided in the coiler shaft. The rotary feed includes a housing surrounding the coiler shaft and/or the shaft extension, wherein at least one connection each is provided in the housing as a supply line and a discharge line and a bushing is mounted in the housing for each supply line and discharge line. The inner and outer walls of each bushing are equipped with annular ducts which are connected to each other through at least one essentially radially directed bore. The outer annular ducts extend under the supply and discharge connections of the housing and discharge provided for the coiler shaft and/or the haft extension extend under the annular ducts. The rotary feed provides a connection between the piston/cylinder unit and a pressure medium force through which the piston/cylinder unit can be supplied continuously with pressure medium even when the coiler is driven so as to rotate for the purposes of winding or unwinding strip.

The rotary feed is to be arranged in such a way that none of the pressure medium lines extends through the shaft of the motor flanged to the coiler shaft or the shaft extension. Accordingly, it is provided to arrange the rotary feed on the shaft extension. However, it is also possible to provide the rotary feed on the coiler shaft itself. By using a double-acting step piston, the necessary spreading and despreading forces can be predetermined in accordance with the corresponding pressure of the pressure medium.

Since the rotary feed includes a stationary housing, the external connections to the rotary feed can be arranged so as to be stationary. Flexible hoses which are complicated and susceptible to trouble are not necessary for these connections. The bushings arranged within the housing can be manufactured significantly more easily than if the housing would have the corresponding bushing shape. In addition, by separately providing a housing, the bushings and the sleeve can be realized with different material pairings which ensure that the wear is as little as possible and that they are adapted to each other with respect to their thermal expansion in such a way that the gaps between the bushings and the sleeves have optimum dimensions even in the difficult conditions of rolling mills.

The sleeve equipped with the supply ducts can be very easily manufactured. The use of this sleeve makes possible the use of solid shaft extensions which do not have bores, so that a high stability of the shaft extensions is ensured.

The pressure medium emerging between the sleeve and the bushings, through which the bushing rests on an oil film on the sleeve, is discharged through leakage oil lines to a tank. The piston/cylinder unit is also provided with leakage oil lines which end in the oil tank. The leakage oil lines of the piston/cylinder unit only conducts oil if seals of the piston/cylinder unit are detected. In that case, leakage oil indicators can be provided which indicate the defect of the seals.

In order to ensure that the oil between the sleeve and the bushings is not interrupted during the coiling operation, a predetermined oil pressure level must always be maintained on the pressure medium lines. The pressure medium line "spreading" is then under sufficient pressure, so that a stable oil film is ensured. The pressure medium line "despreading" could theoretically be without pressure during the coiling operation, which, however, would lead to damage of the rotary feed if the oil pressure level were not also maintained on the pressure medium line "despreading".

However, it is also possible to provide additional annular ducts and radial bores in the bushings in order to maintain through the ducts and bores statically an oil film between the sleeve and the corresponding bushing. In that case, the pressure medium lines "despreading" could also remain without pressure during the operation. The oil film has the purpose of absorbing the great weight of the bushings and any acceleration forces which occur at the rolling mill coilers as a consequence of vibrations. A significant advantage of the static oil film results from the elastic expansion of the sealing gap. As a result, defects with respect to shape, for example, deviations from the circular shape, which could occur as a result of the mechanical processing and a change of the natural stress condition under pressure and temperature, are compensated.

The outer surface of the sleeve and/or the inner surface of the bushings have ceramic coatings to ensure a longer service life of the sleeve and of the bushings. The resilient support of the bushings in the housing, for example, through O-rings, is advantageous for compensating for symmetric deviations which may occur when manufacturing the individual structural components. The bushings are centered through the oil film on the sleeve and are provided by the O-rings with the possibility of adjusting themselves to the position of the sleeves.

BRIEF DESCRIPTION OF THE DRAWING

The invention will be explained in more detail with the aid of a drawing. In the drawing.

DESCRIPTION OF THE PREFERRED EMBODIMENTS

Figure 1:
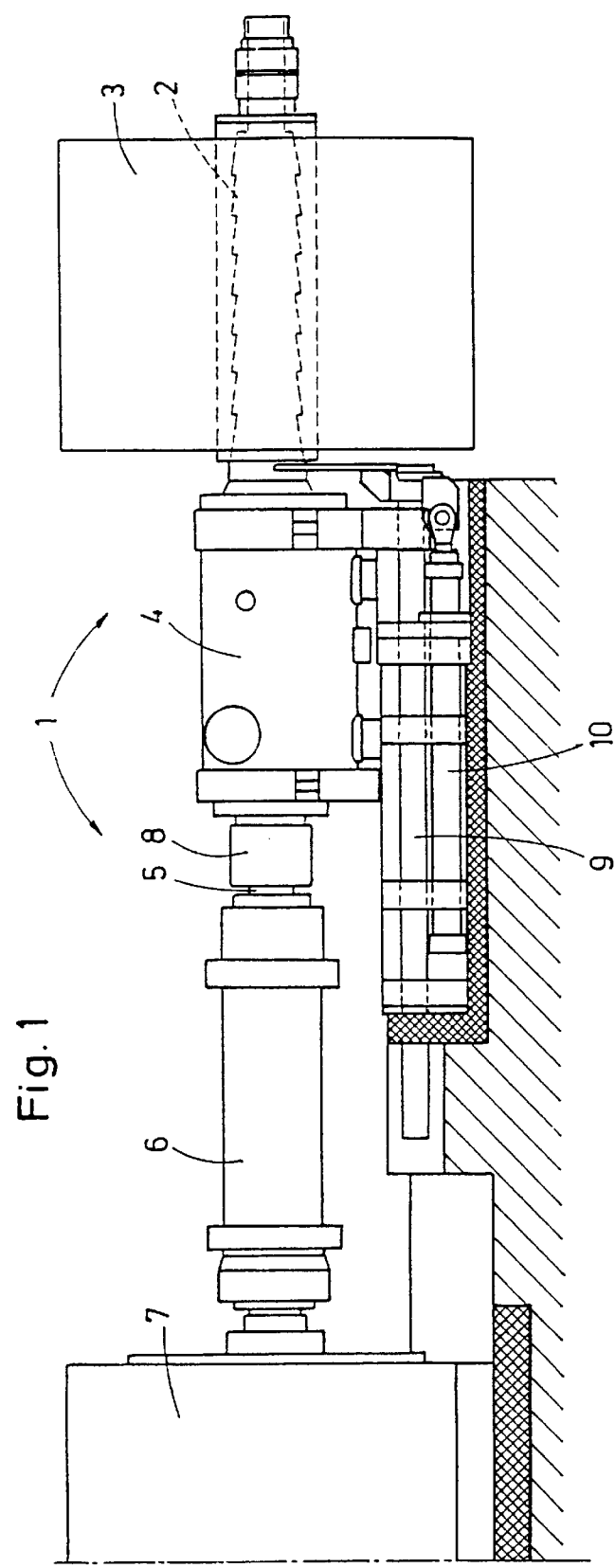
FIG. 1 shows a coiler according to the invention.

FIG. 1 shows a coiler 1 composed of a drum 2 onto which is wound a coil 3, a coiler shaft 4, a shaft extension 5, a shaft coupling 6 and a motor 7. A rotary feed 8 is arranged on the shaft extension 5. The coiler 1 is provided with a push member 10 arranged on a guide 9; the push member 10 has the purpose of pushing the coils 3 from the drum 2.

Figure 2:
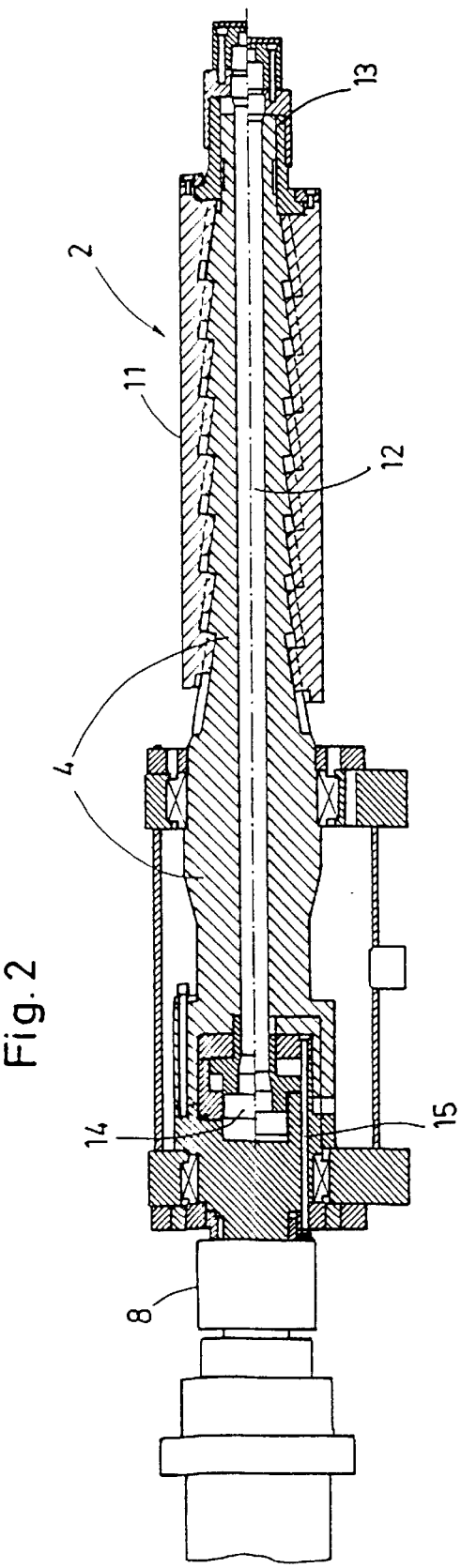
FIG. 2 is a partial sectional view corresponding to FIG. 1.

FIG. 2 shows the drum 2 in a partially spread and partially despread position. The drum segments 11 are displaceable on the coiler shaft 4 through a plunger 12 and a connecting flange 13. The plunger 12 can be driven by a piston/cylinder unit 14 which is connected through pressure medium lines 15, 15' to the rotary feed 8.

Figure 3:
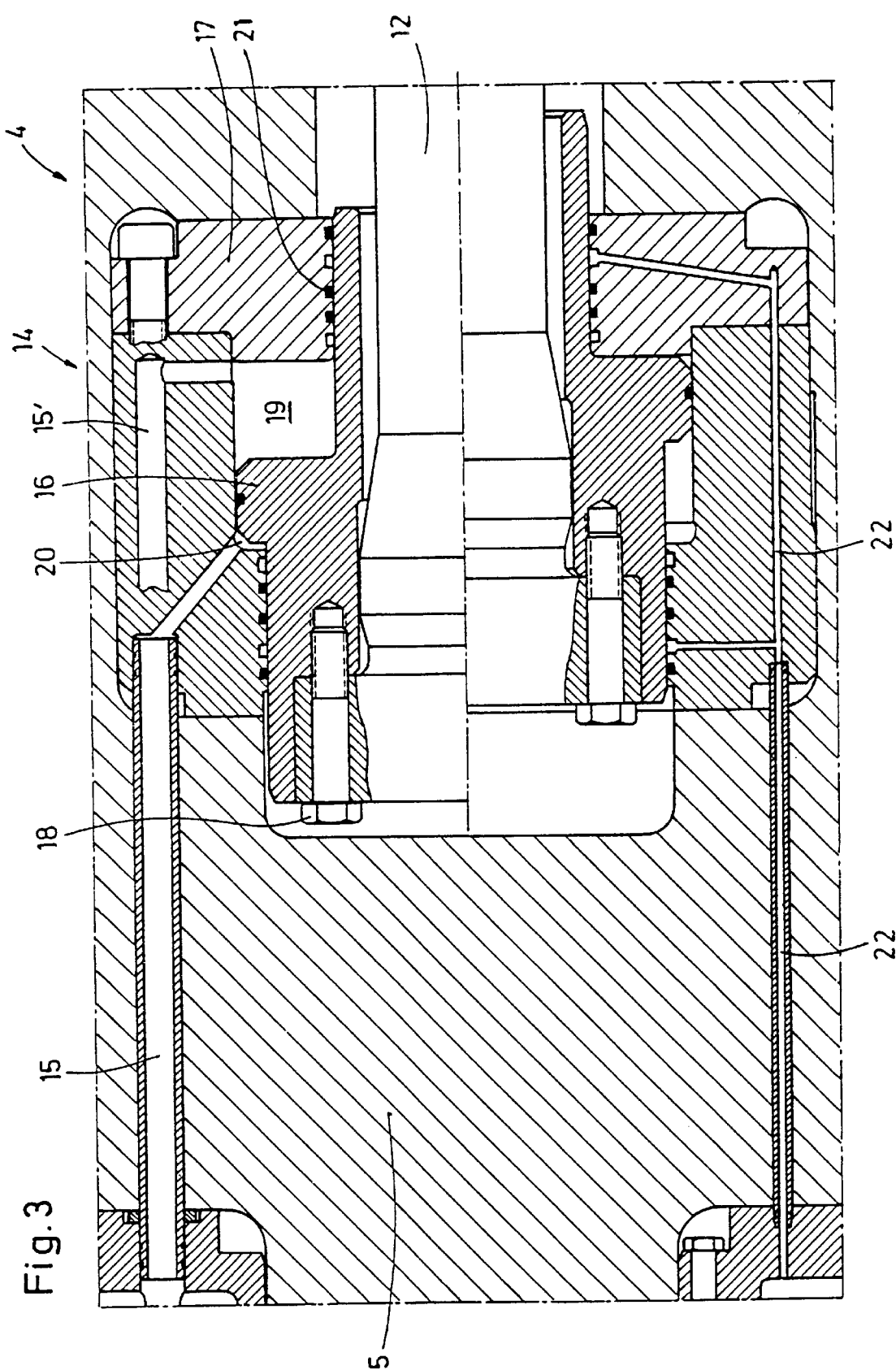
FIG. 3 shows a piston/cylinder unit according to the invention.

FIG. 3 shows the piston 16 and the cylinder 17 of the piston/cylinder unit 14 integrated in the coiler shaft 4. The cylinder 17 is held axially by the shaft extension 5. The piston 16 is connected through screws 18 to the plunger 12. The pressure medium lines 15, 15', shown arranged one behind the other in FIG. 3, end in the cylinder spaces 19, 20. The piston 16 is sealed in the cylinder 17 through sealing rings 21. Leakage oil lines 22 have the purpose of collecting any emerging leakage oil quantities and to discharge them to an oil tank, not shown. If oil is conducted in the leakage oil lines 22, this is a sign that the sealing rings 21 are damaged.

Figure 4:
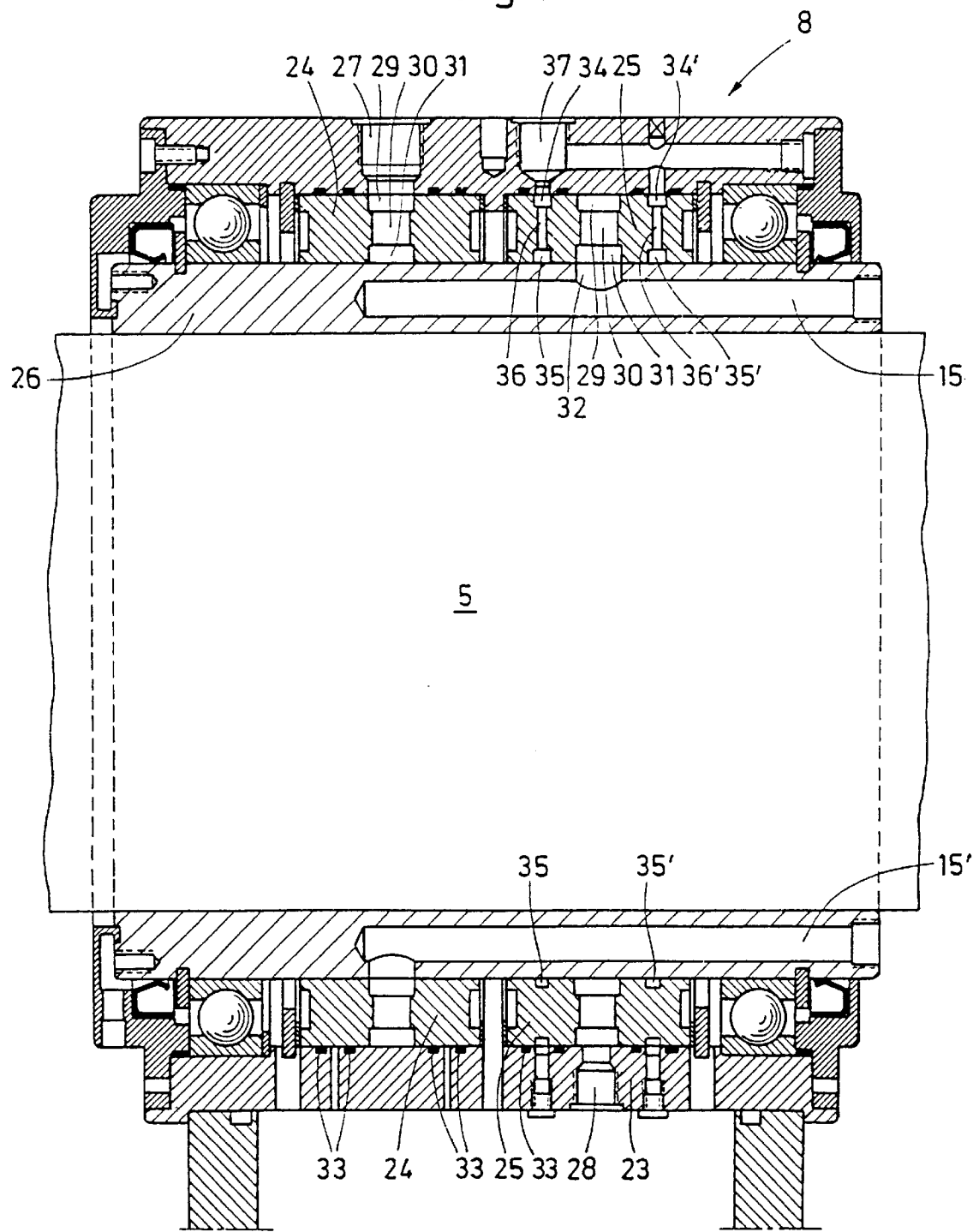
FIG. 4 shows a rotary feed according to the invention.

FIG. 4 shows the shaft extension 5 on which the rotary feed 8 is arranged. The rotary feed 8 is composed of a housing 23 in which bushings 24, 25 are mounted. The bushings 24, 25 are mounted on a sleeve 26 which surrounds the shaft extension 5.

Provided on the housing 23 is a connection 27 for the pressure medium for the spreading procedure of the drum 2 as well as a connection 28 for the pressure medium for despreading the drum 2. In the area in which the connections 27, 28 overlap the bushings 24, 25, the bushings 24, 25 have annular ducts 29 which are connected to annular ducts 31 through the discharge bores 30. The annular ducts 31 are located opposite discharge bores 32 in the sleeves 36. The discharge bores 32 end in the pressure medium lines 15, 15'.

The bushings 24 and 25 are mounted in the housing 23 through O-rings 33. During operation, an oil film on which the bushing 24 floats is formed between the bushings 24 and sleeve 26. The oil emerging between the bushing 24 and the sleeve 26 is collected by a leakage oil line and is supplied to the oil tank, not shown.

The annular duct 31 of the bushing 25, which is located opposite the connection 28 for despreading, may be without pressure during the normal coiling operation. If a bushing corresponding to the bushing 24 were to be used for the bushing 25, a certain pressure would have to prevail during the coiling operation also in the despreading line, so that the lubrication between the bushing and the sleeve 26 is ensured.

However, the bushing 25 shown in FIG. 4 has additional annular ducts 34, 35; 34', 35' and radial bores 36; 36' through which a pressure medium for maintaining the sliding film is conducted continuously into the gap between the bushing 25 and the sleeve 26. The connection 37 has the purpose of conducting the lubricant to the bushing 25 in order to ensure in this manner the hydrostatic support of the bushing 25 on the sleeve 26 without the requirement that pressurized medium must be present at the connection 28. Of course, a corresponding hydrostatic configuration could also be provided for the bushing 24 or any additional bushings which are not shown.

List of Reference Numerals
1 Coiler
2 Drum
3 Coil
4 Coiler Shaft
5 Shaft Extension
6 Shaft Coupling
7 Motor
8 Rotary Feed
9 Guide
10 Push Member
11 Drum Segments
12 Plunger
13 Connecting Flange
14 Piston/Cylinder Unit
15 Pressure Medium Line
16 Piston
17 Cylinder
18 Screw
19 Cylinder Space
20 Cylinder Space
21 Sealing Ring
22 Leakage Coil Line 23 Housing
24 Bushing
25 Bushing
26 Sleeve
27 Connection
28 Connection
29 Annular Duct
30 Radial Bore
31 Annular Duct
32 Discharge Bore
33 O-Ring
34 Annular Duct
35 Annular Duct
36 Radial Bore
37 Connection

What is claimed is:

1. Direct-drive coiler for winding and/or unwinding rolled strip with a drum composed of several segments which can be moved so as to be spread and which rest with conically-shaped sliding surfaces against a coiling shaft mounted rotatably cantilevered in a coiler housing, with a plunger guided in the coiler shaft, wherein the plunger is connected through a connecting flange to the drum segments, wherein an axially extending cylinder (17) is mounted in the coiler shaft (4), wherein the cylinder (17) has a piston (16) which is connected to the plunger (12) and can effect a relative axial displacement between the coiler shaft and the plunger connected to the segments for producing a spreading movement of the segments, wherein the coiler shaft (4) extends beyond the cylinder (17) with a flanged-on shaft extension (5) which closes the cylinder (17) in the direction toward the axially arranged, directly driving motor (7), and a rotary feed (8) is provided through which pressure medium can be supplied to the piston/cylinder unit (14) provided in the coiler shaft (4), characterized in that the rotary feed (8) includes a housing (23) surrounding the coiler shaft (4) and/or the shaft extension (5), wherein at least one connection (27, 28) each is provided in the housing (23) as a supply line and a discharge line and a bushing (24, 25) is mounted in the housing (23) for each supply line and discharge line, wherein the inner and outer walls of each bushing are equipped with annular ducts (29, 31) which are connected to each other through at least one essentially radially directed bore (30), wherein the outer annular ducts (29) extend under the supply and discharge connections (27, 28) of the housing (23) and discharge bores (32) provided for the coiler shaft (4) and/or the shaft extension (5) extend under the annular ducts (31).

2. Direct-drive coiler according to claim 1, wherein the discharge bores (32) are provided in a sleeve (26) surrounding the coiler shaft (4) and/or the shaft extension (5), wherein the sleeve (26) has pressure medium lines (15, 15') to the piston/cylinder unit (14).

3. Direct-drive coiler according to claim 2, wherein at least the bushing (25) has additional annular ducts (34, 35; 34', 35') and radial bores (36; 36') connecting the additional annular ducts, wherein pressure medium can be supplied to the radial bores for effecting the lubrication between the sleeve (26) and the bushing (25).

4. Direct-drive coiler according to claim 2, wherein the outer surface of the sleeve (26) and/or the inner surfaces of the bushings (24, 25) are coated with ceramic material.

5. Direct-drive coiler according to claim 1, wherein the piston/cylinder unit (14) and the rotary feeds (8) have collection spaces for leakage oil which can be supplied to an oil tank through leakage oil lines (22).

6. Direct-drive coiler according to claim 1, wherein during the coiler operation at least one predetermined pressure level is maintained on the pressure medium lines (15, 15').

7. Direct-drive coiler according to claim 1, wherein the bushings (24, 25) are mounted resiliently in the housing (23).

* * * * *